US009223750B2

(12) United States Patent
Liu et al.

(10) Patent No.: US 9,223,750 B2
(45) Date of Patent: Dec. 29, 2015

(54) DYNAMIC TAG GENERATING APPARATUS AND DYNAMIC TAG GENERATING METHOD THEREOF FOR USE IN DISPLAY APPARATUS

(71) Applicant: Institute For Information Industry, Taipei (TW)

(72) Inventors: Chi-Hsien Liu, Yuanlin Township (TW); Tsung-Yu Chiang, Taipei (TW); Li-Ting Chen, Taipei (TW); Chien-Wen Huang, Taipei (TW)

(73) Assignee: Institute For Information Industry, Taipei (TW)

( * ) Notice: Subject to any disclaimer, the term of this patent is extended or adjusted under 35 U.S.C. 154(b) by 380 days.

(21) Appl. No.: 13/746,425

(22) Filed: Jan. 22, 2013

(65) Prior Publication Data

US 2014/0144980 A1    May 29, 2014

(30) Foreign Application Priority Data

Nov. 23, 2012  (TW) .............................. 101143855 A

(51) Int. Cl.
G06F 17/00 (2006.01)
G06Q 30/02 (2012.01)
(52) U.S. Cl.
CPC ............ G06F 17/00 (2013.01); G06Q 30/0241 (2013.01)
(58) Field of Classification Search
USPC ................. 235/375, 472.01, 462.09; 726/4, 6
See application file for complete search history.

(56) References Cited

U.S. PATENT DOCUMENTS

| 8,662,398 | B1* | 3/2014 | Egyed .................... 235/462.45 |
| 2006/0271328 | A1 | 11/2006 | Forster |
| 2007/0136130 | A1 | 6/2007 | Liu et al. |
| 2011/0320293 | A1 | 12/2011 | Khan |
| 2012/0089471 | A1 | 4/2012 | Comparelli |
| 2012/0173318 | A1* | 7/2012 | Lee et al. ..................... 705/14.4 |
| 2014/0197232 | A1* | 7/2014 | Birkler et al. ................. 235/375 |

FOREIGN PATENT DOCUMENTS

| TW | 201030625 A | 8/2010 |
| TW | 201110048 A | 3/2011 |
| TW | 201218084 A | 5/2012 |
| WO | 2010082835 A1 | 7/2010 |
| WO | 2012094329 A1 | 7/2012 |

OTHER PUBLICATIONS

Office Action to the corresponding Taiwan Patent Application No. 10321327370 rendered by Taiwan Intellectual Property Office (TIPO) on Sep. 24, 2014, 15 pages.
Extended European search report to the corresponding European patent application No. EP13000311 rendered by the European Patent Office on Feb. 28, 2014, 7 pages.

* cited by examiner

*Primary Examiner* — Ahshik Kim
(74) *Attorney, Agent, or Firm* — Skaar Ulbrich Macari, P.A.

(57) ABSTRACT

A dynamic tag generating apparatus and a dynamic tag generating method thereof are provided. The dynamic tag generating apparatus is disposed in a display apparatus, and the display apparatus is connected to a server. The dynamic tag generating apparatus receives tag update information from the server through the display apparatus, and updates a tag content of the display apparatus according to the tag update information. The dynamic tag generating apparatus provides the tag content to a tag analyzing apparatus so that the tag analyzing apparatus analyzes the tag content.

6 Claims, 6 Drawing Sheets

DYNAMIC TAG GENERATING APPARATUS AND DYNAMIC TAG GENERATING METHOD THEREOF FOR USE IN DISPLAY APPARATUS

PRIORITY

This application claims priority to Taiwan Patent Application No. 101143855 filed on Nov. 23, 2012, which is hereby incorporated by reference in its entirety.

FIELD

The present invention relates to a dynamic tag generating apparatus and a dynamic tag generating method thereof. More particularly, the dynamic tag generating apparatus and the dynamic tag generating method thereof of the present invention are mainly used in a display apparatus to dynamically update a tag by using information from a remote server.

BACKGROUND

As is conventionally known, electronic display apparatuses have the basic function of playing multimedia. Therefore, as a common technical means in the art, electronic display apparatuses (e.g., digital signages) are often disposed in public places to play predetermined multimedia for purpose of information transferring. However, with the advancement of the science and technologies, it is desired that users can not only obtain information from the electronic display apparatuses, but also interact with the electronic display apparatuses and the information played by the electronic display apparatuses. Correspondingly, applications of disposing interactive tags on electronic display apparatuses have been developed.

As an example, if an advertising agency hopes that a user who is watching multimedia played by a digital signage can further connect to a specific website via a mobile apparatus or create a connection with the digital signage to receive data, the advertising agency may dispose a Near Field Communication (NFC) tag or a Quick Response (QR) code containing specific data on the electronic display apparatus in advance. Then, the user who is watching the multimedia file played by the electronic display apparatus can read the NFC tag or QR tag code via the mobile apparatus directly to connect to the specific website, or read the NFC tag to create a connection with the digital signage for purpose of data transmission.

However, existing interactive tags are disposed on the electronic display apparatuses all in an invariable mode. For example, an NFC tag or a QR code containing preset data is disposed on an electronic display apparatus directly, and then when it is desired to alter the content of the interactive tag, mostly a person must go to the electronic display apparatus to alter the interactive manually (e.g., by altering the content of the NFC tag) or to replace the physical interactive tag (e.g., by removing the original physical NFC tag or QR code and replacing it with a new NFC tag or QR code). This makes the combinational use of the electronic display apparatus and the interactive tags inflexible and inconvenient.

Accordingly, an urgent need exists in the art to update the tag content in an electronic display apparatus having an interactive tag more efficiently so as to overcome the shortcoming of the prior art.

SUMMARY

To solve the aforesaid problems, the present invention provides a dynamic tag generating apparatus and a dynamic tag generating method thereof, which receive tag update information from a remote server through a display apparatus to dynamically update an interactive tag. Thereby, update of the content of the interactive tag can be accomplished in a most efficient and convenient way.

To achieve the aforesaid objective, the present invention provides a dynamic tag generating method for use in a dynamic tag generating apparatus. The dynamic tag generating apparatus is disposed in a display apparatus, and the display apparatus is connected to a server. The dynamic tag generating method comprises the following steps of: (a) enabling the dynamic tag generating apparatus to receive tag update information from the server through the display apparatus; (b) enabling the dynamic tag generating apparatus to update a tag content according to the tag update information; and (c) enabling the dynamic tag generating apparatus to provide the tag content to a tag analyzing apparatus so that the tag analyzing apparatus analyzes the tag content.

To achieve the aforesaid objective, the present invention further provides a dynamic tag generating apparatus disposed in a display apparatus. The display apparatus is connected to a server. The dynamic tag generating apparatus comprises an input/output (I/O) interface and a processor. The I/O interface is configured to receive tag update information from the server through the display apparatus. The processor is configured to update a tag content according to the tag update information and provide the tag content to a tag analyzing apparatus so that the tag analyzing apparatus analyzes the tag content.

With the above technical disclosures, the dynamic tag generating apparatus and the dynamic tag generating method thereof of the present invention can dynamically update the content of the interactive tag on the display apparatus directly according to information from the server. This can obviate the inconvenience of manually altering the content of the tag and remarkably improve the efficiency of altering the tag.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following descriptions, the present invention will be explained with reference to example embodiments thereof. However, these example embodiments of the present invention are not intended to limit the present invention to any specific examples, embodiments, environment, applications or particular implementations described in these embodiments. Therefore, description of these embodiments is only for purpose of illustration rather than to limit the present invention. It shall be appreciated that, in the following embodiments and the attached drawings, elements unrelated to the present invention are omitted from depiction.

Figure 1A:
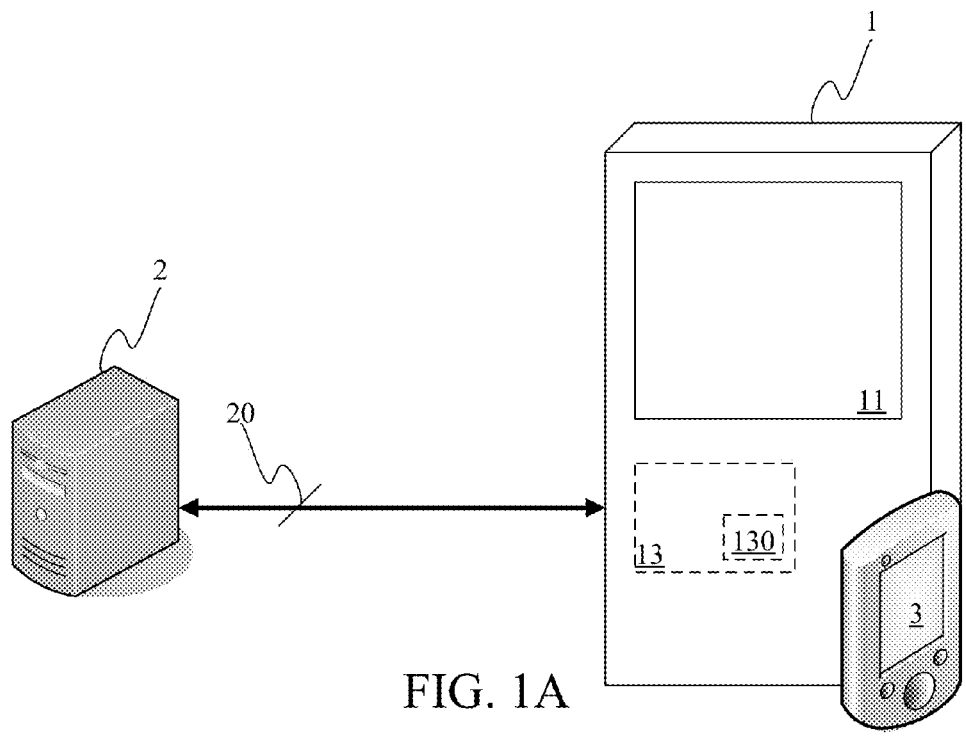
FIG. 1A is a schematic view of a display apparatus according to a first embodiment of the present invention.
Figure 1B:
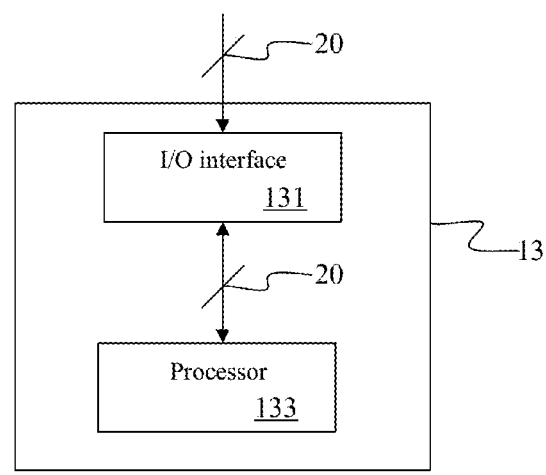
FIG. 1B is a schematic view of a dynamic tag generating apparatus according to the first embodiment of the present invention.

Please refer to FIG. 1A and FIG. 1B. FIG. 1A is a schematic view of a display apparatus 1 according to a first embodiment of the present invention. The display apparatus 1 comprises a display panel 11 and a dynamic tag generating apparatus 13. The display apparatus 1 connects to a server 2, and the display panel 11 is configured to display the multimedia data. FIG. 1B is a block diagram of the dynamic tag generating apparatus 13 according to the first embodiment of the present invention. The dynamic tag generating apparatus 13 comprises an input/output (I/O) interface 131 and a processor 133. The I/O interface 131 is electrically connected to the display apparatus 1. Interactions among the individual components will be further described herein.

Firstly, when an operator desires to alter a tag content of the dynamic tag generating apparatus 13, he or she may store the tag data to be updated into the server 2 directly. Thus, the dynamic tag generating apparatus 13 can receive the update data from the server 2 via the display apparatus 1 connected with the server 2 and then dynamically alter the tag content of the dynamic tag generating apparatus 13.

Specifically, the I/O interface 131 of the dynamic tag generating apparatus 13 firstly receives tag update information 20 from the server 2 via the display apparatus 1. Then, the processor 133 of the dynamic tag generating apparatus 13 can update or replace the tag content 130 of the dynamic tag generating apparatus 13 according to the tag update information 20. Thus, the processor 133 of the dynamic tag generating apparatus 13 can provide the tag content 130 to a tag analyzing apparatus 3 used by the user so that, after the tag content 130 is analyzed by the tag analyzing apparatus 3, the user can know the message to be conveyed by the tag content 130. It shall be particularly appreciated that, the tag content 130 may be used in combination with the multimedia played by the display panel 11 of the display apparatus 1 to interact with the user in real time.

Furthermore, in other implementations, the tag update information 20 may further comprise a network connection configuration setting. In this case, the processor 133 of the dynamic tag generating apparatus 13 can provide the tag content 130 comprising the network connection configuration setting to the tag analyzing apparatus 3 after the tag content 130 has been updated. Thus, after analyzing the tag content 130, the tag analyzing apparatus 3 can create a network connection with the display apparatus 1 according to the network connection configuration setting so as to exchange data with the display apparatus 1. Briefly speaking, the present invention can also use the tag update information to accomplish the interaction between the user and the display apparatus.

Figure 2A:
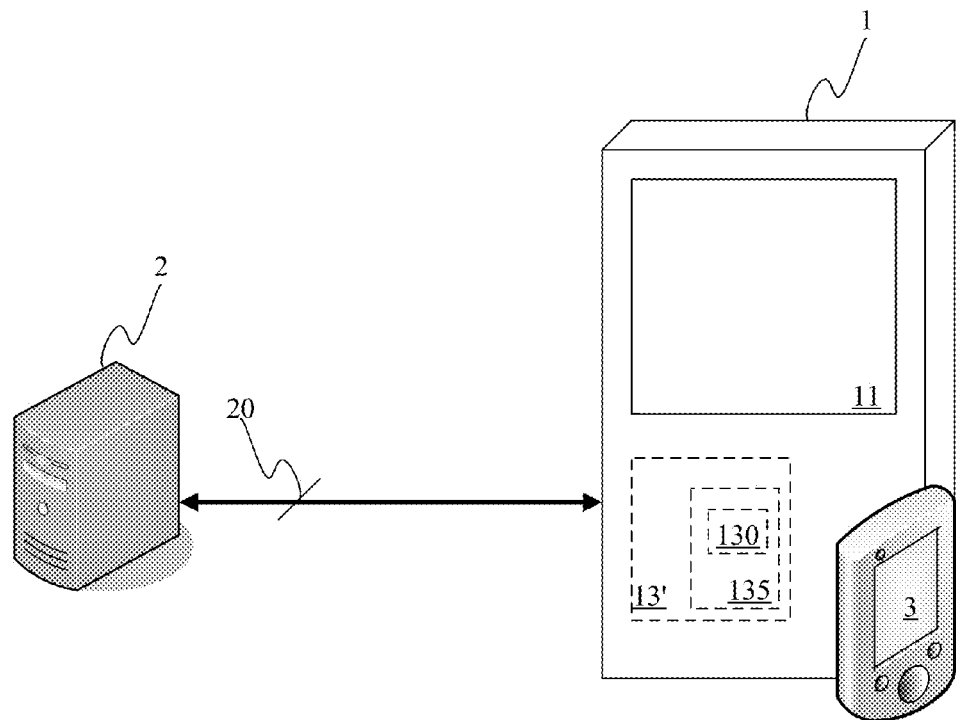
FIG. 2A is a schematic view of a display apparatus according to a second embodiment of the present invention.
Figure 2B:
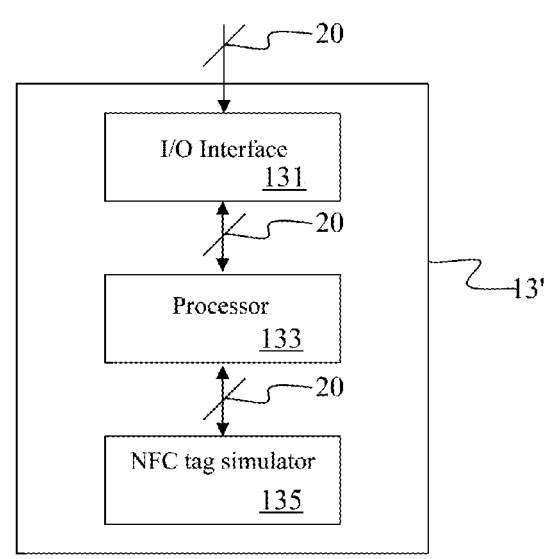
FIG. 2B is a schematic view of a dynamic tag generating apparatus according to the second embodiment of the present invention.

Next, implementations of the present invention will be described with reference to different exemplary examples. Please refer to FIG. 2A and FIG. 2B. FIG. 2A is a schematic view of a display apparatus 1 according to a second embodiment of the present invention, and FIG. 2B is a schematic view of a dynamic tag generating apparatus 13' according to the second embodiment of the present invention. It shall be particularly noted that, the system architecture and the network connection environment of the second embodiment are the same as those of the first embodiment, so elements bearing the same reference numerals also have the same functions and will not be further described herein. The second embodiment mainly describes an implementation in which the tag is a Near Field Communication (NFC) tag.

Specifically, in the second embodiment, the dynamic tag generating apparatus 13' further comprises an NFC tag simulator 135 that stores the tag content 130, the tag content 130 is an NFC tag content, and the tag update information 20 is NFC tag update information. Accordingly, the processor 133 of the dynamic tag generating apparatus 13' can update the NFC tag content stored in the NFC tag simulator 135 according to the NFC tag update information. Then, the tag analyzing apparatus 3 can obtain the NFC tag content directly from the NFC tag simulator 135 and analyze the NFC tag content. Then, the user can execute common NFC applications such as accessing a network resource or performing an apparatus configuration setting.

Figure 3A:
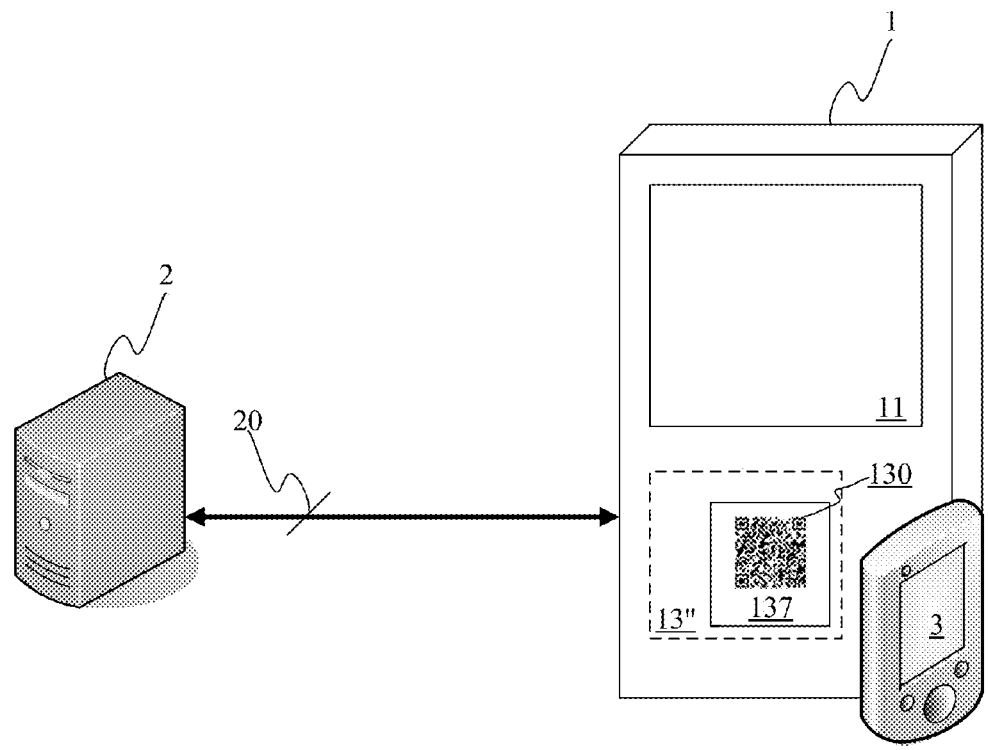
FIG. 3A is a schematic view of a display apparatus according to a third embodiment of the present invention.
Figure 3B:
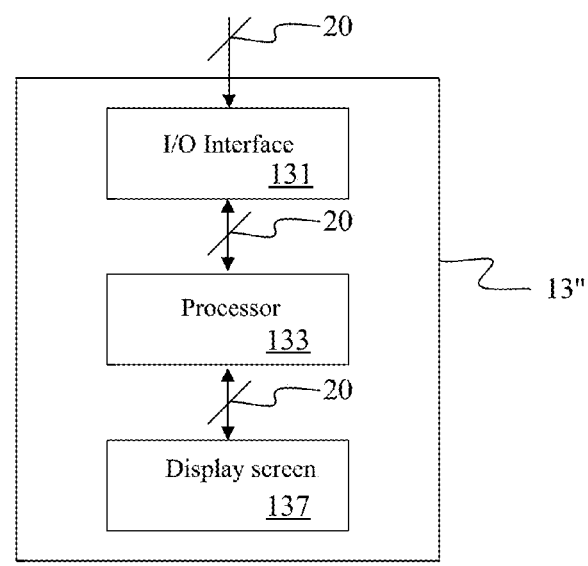
FIG. 3B is a schematic view of a dynamic tag generating apparatus according to the third embodiment of the present invention.

Please refer to FIG. 3A and FIG. 3B. FIG. 3A is a schematic view of a display apparatus 1 according to a third embodiment of the present invention, and FIG. 3B is a schematic view of a dynamic tag generating apparatus 13" according to the third embodiment of the present invention. It shall be particularly noted that, the system architecture and the network connection environment of the third embodiment are the same as those of the previous embodiment, so elements bearing the same reference numerals also have the same functions and will not be further described herein. The third embodiment mainly describes an implementation in which the tag is a Quick Response (QR) code.

Specifically, in the third embodiment, the dynamic tag generating apparatus 13" further comprises a display screen 137 configured to display the tag content 130. The tag content 130 may be a QR code, and the tag update information 20 is QR code update information. Accordingly, the processor 133 of the dynamic tag generating apparatus 13" can update a display picture of the display screen 137 according to the QR code update information so that the display picture comprises the updated QR code. Then, the tag analyzing apparatus 3 can directly analyze the QR code displayed in the display picture and access a network resource according to the QR code. It shall be particularly noted that, the display screen 137 of the dynamic tag generating apparatus 13" may also be integrated into the display screen 11 of the display apparatus 1 so that the QR code will be associated in real time with the multimedia played by the display screen 11.

Figure 4:
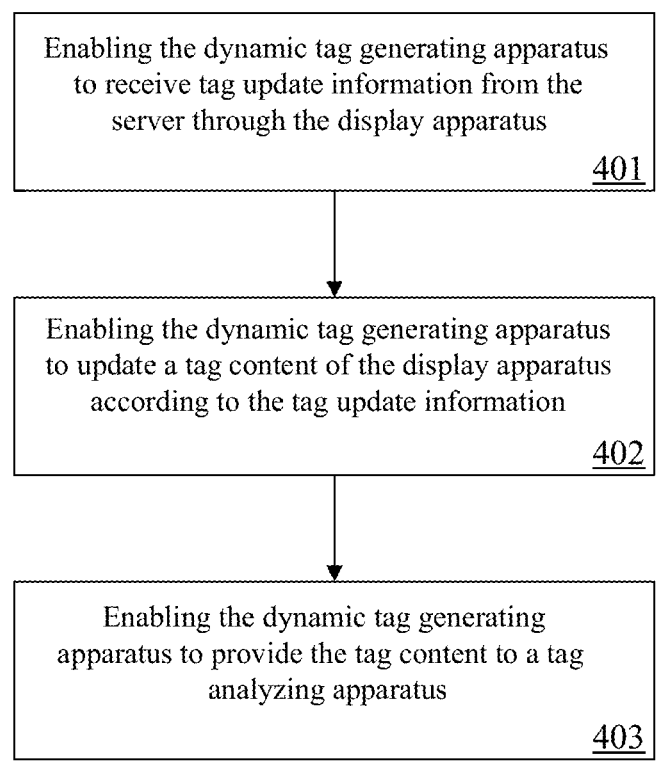
FIG. 4 is a flowchart diagram of a dynamic tag generating method according to a fourth embodiment of the present invention.

A fourth embodiment of the present invention is a dynamic tag generating method, a flowchart diagram of which is shown in FIG. 4. The dynamic tag generating method of the fourth embodiment is for use in a dynamic tag generating apparatus (e.g., the dynamic tag generating apparatus 13 of the first embodiment). The dynamic tag generating apparatus is disposed in a display apparatus, and the display apparatus connects to a server. Steps of the fourth embodiment are detailed as follows.

Firstly, step 401 is executed to enable the dynamic tag generating apparatus to receive tag update information from the server through the display apparatus. Then, step 402 is executed to enable the dynamic tag generating apparatus to update a tag content according to the tag update information. Finally, step 403 is executed to enable the dynamic tag generating apparatus to provide the tag content to a tag analyzing apparatus so that the tag analyzing apparatus analyzes the tag content.

Similarly, in other implementations of the dynamic tag generating method, the tag update information may also comprise a network connection configuration setting. In this case, the dynamic tag generating apparatus can provide the tag content containing the network connection configuration setting to the tag analyzing apparatus after the tag content has been updated. Thereby, after analyzing the tag content, the tag analyzing apparatus can create a network connection with the display apparatus according to the network connection configuration setting and exchanges data with the display apparatus.

Figure 5:
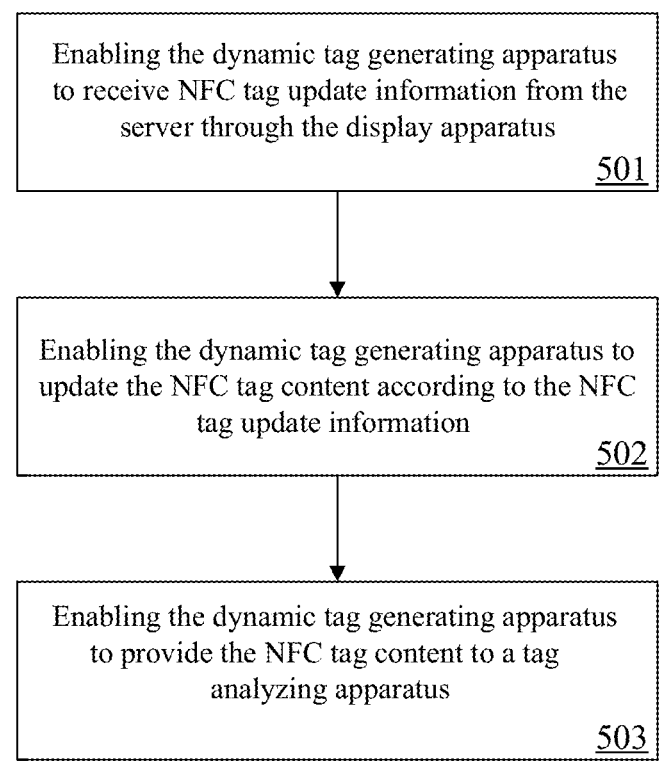
FIG. 5 is a flowchart diagram of a dynamic tag generating method according to a fifth embodiment of the present invention.

A fifth embodiment of the present invention is a dynamic tag generating method, a flowchart diagram of which is shown in FIG. 5. The dynamic tag generating method of the fifth embodiment is for use in a dynamic tag generating apparatus (e.g., the dynamic tag generating apparatus 13' of the second embodiment). The dynamic tag generating apparatus is disposed in a display apparatus, and the display apparatus connects to a server. Steps of the fifth embodiment are detailed as follows.

Firstly, step 501 is executed to enable the dynamic tag generating apparatus to receive NFC tag update information from the server through the display apparatus. Then, step 502 is executed to enable the dynamic tag generating apparatus to update an NFC tag content stored in the dynamic tag generating apparatus according to the NFC tag update information. Finally, step 503 is executed to enable the dynamic tag generating apparatus to provide the NFC tag content to a tag analyzing apparatus so that the tag analyzing apparatus accesses a network resource or performs an apparatus configuration setting after analyzing the NFC tag content.

Figure 6:
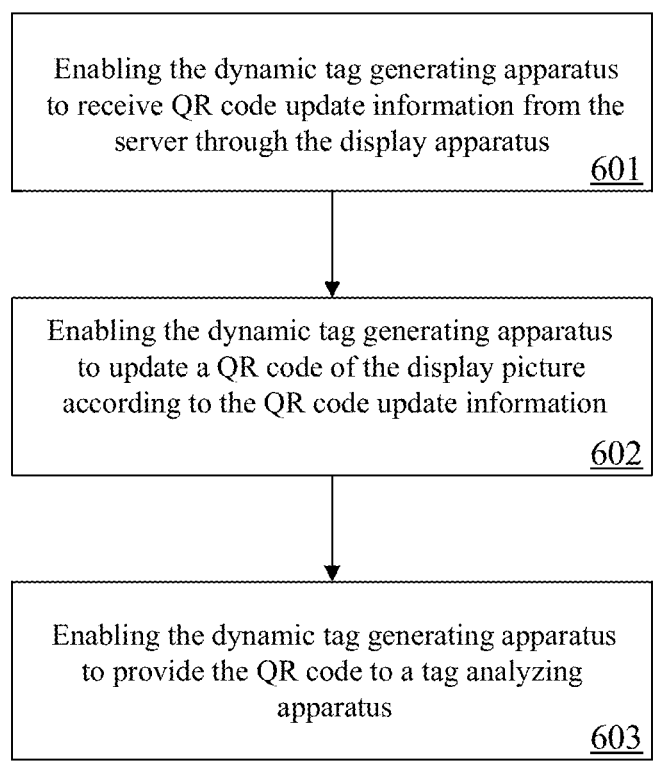
FIG. 6 is a flowchart diagram of a dynamic tag generating method according to a sixth embodiment of the present invention.

A sixth embodiment of the present invention is a dynamic tag generating method, a flowchart diagram of which is shown in FIG. 6. The dynamic tag generating method of the sixth embodiment is for use in a dynamic tag generating apparatus (e.g., the dynamic tag generating apparatus 13" of the third embodiment). The dynamic tag generating apparatus is disposed in a display apparatus, and the display apparatus connects to a server. Steps of the sixth embodiment are detailed as follows.

Firstly, step 601 is executed to enable the dynamic tag generating apparatus to receive a QR code update information from the server through the display apparatus. Then, step 602 is executed to enable the dynamic tag generating apparatus to update a display picture according to the QR code update information. The updated display picture comprises a QR code. Finally, step 603 is executed to enable the dynamic tag generating apparatus to provide the QR code to a tag analyzing apparatus through the display picture so that the tag analyzing apparatus accesses a network resource after analyzing the QR code.

According to the above descriptions, the dynamic tag generating apparatus and the dynamic tag generating method of the present invention can directly use the data already created in the cloud server to dynamically update the content of the interactive tag. This remarkably improves the convenience in use of the display apparatus in which interactive tags are used.

What is claimed is:

1. A dynamic tag generating method for use in a dynamic tag generating apparatus, the dynamic tag generating apparatus being disposed in a display apparatus, and the display apparatus being connected to a server, the dynamic tag generating method comprising the steps of:
   (a) receiving, by an input/output (I/O) interface of the dynamic tag generating apparatus, a Near Field Communication (NFC) tag update information from the server through the display apparatus;
   (b) updating, by a processor of the dynamic tag generating apparatus, a NFC tag content stored in a NFC tag simulator of the dynamic tag generating apparatus according to the NFC tag update information; and
   (c) providing, by the processor of the dynamic tag generating apparatus, the NFC tag content to a tag analyzing apparatus through the NFC tag simulator so that the tag analyzing apparatus analyzes the NFC tag content from the NFC tag simulator.

2. The dynamic tag generating method as claimed in claim 1, wherein the step (c) further comprises:
   (c1) enabling the dynamic tag generating apparatus to provide the NFC tag content to the tag analyzing apparatus so that the tag analyzing apparatus accesses a network resource or performs an apparatus configuration setting according to the NFC tag content.

3. The dynamic tag generating method as claimed in claim 1, wherein the NFC tag content further contains a network connection configuration setting, and the step (c) further comprises:
   (c1) enabling the dynamic tag generating apparatus to provide the NFC tag content containing the network connection configuration setting to the tag analyzing apparatus so that, after analyzing the NFC tag content, the tag analyzing apparatus creates a network connection with the display apparatus according to the network connection configuration setting and exchanges data with the display apparatus.

4. A dynamic tag generating apparatus disposed in a display apparatus, the display apparatus being connected to a server, the dynamic tag generating apparatus comprising:
   an NFC tag simulator, being configured to store a NFC tag content;
   an input/output (I/O) interface electrically connected to the display apparatus, being configured to receive a NFC tag update information from the server through the display apparatus; and
   a processor, being configured to update the NFC tag content stored in the NFC tag simulator according to the NFC tag update information and provide the NFC tag content to a tag analyzing apparatus through the NFC tag simulator so that the tag analyzing apparatus analyzes the NFC tag content from the NFC tag simulator.

5. The dynamic tag generating apparatus as claimed in claim 4, wherein the processor is further configured to provide the NFC tag content to the tag analyzing apparatus through the NFC tag simulator so that the tag analyzing apparatus accesses a network resource or performs an apparatus configuration setting according to the NFC tag content.

6. The dynamic tag generating apparatus as claimed in claim 4, wherein the NFC tag content further contains a network connection configuration setting, and the processor is further configured to provide the NFC tag content containing the network connection configuration setting to the tag analyzing apparatus so that, after analyzing the NFC tag content, the tag analyzing apparatus creates a network connection with the display apparatus according to the network connection configuration setting and exchanges data with the display apparatus.

* * * * *